United States Patent [19]
Johnson

[11] 4,220,855
[45] Sep. 2, 1980

[54] SCINTILLATION COUNTER WITH ROTATABLE LIGHT SEAL

[75] Inventor: James F. Johnson, LaGrange Park, Ill.

[73] Assignee: Packard Instrument Company, Inc., Downers Grove, Ill.

[21] Appl. No.: 946,801

[22] Filed: Sep. 28, 1978

[51] Int. Cl.$^2$ ............................................. G01T 1/00
[52] U.S. Cl. .................................................. 250/328
[58] Field of Search ....................... 250/328, 364, 498

[56] References Cited

U.S. PATENT DOCUMENTS

| | | | |
|---|---|---|---|
| 1,911,015 | 5/1933 | Crabbe et al. ..................... | 187/29 L |
| 2,924,718 | 2/1960 | Packard et al. ..................... | 250/328 |
| 3,163,756 | 12/1964 | Meeder et al. ..................... | 250/328 |
| 3,187,182 | 6/1965 | Fratantuno .......................... | 250/328 |
| 3,270,202 | 8/1966 | Long et al. .......................... | 250/328 |
| 3,553,454 | 1/1971 | Olson et al. ......................... | 250/328 |
| 3,852,599 | 12/1974 | Smith ................................... | 250/328 |

*Primary Examiner*—Davis L. Willis
*Attorney, Agent, or Firm*—Leydig, Voit, Osann, Mayer & Holt, Ltd.

[57] ABSTRACT

A light seal for the counting chamber of a scintillation counter comprises a ring shutter mounted in the shielded housing which forms the counting chamber. The ring shutter is mounted for rotation between an open position where an aperture in the ring shutter is aligned with an opening into the shielding housing to permit transfer of sample vials in and out of the counting chamber, and a closed position where a shroud portion of the shutter covers the opening in the housing to block the entry of light. The ring shutter closely surrounds the sample vial in the counting chamber and is preferably formed of a radiation shielding material. The shroud portion of the ring shutter includes a cam for engaging a sample vial disposed within the shutter aperture when the shutter rotates from the open position to the closed position, for lifting the sample vial to a predetermined elevation within the counting chamber. A reflector disposed within the counting chamber cooperates with the cam portion of the shutter for laterally positioning the sample vial within the counting chamber.

6 Claims, 11 Drawing Figures

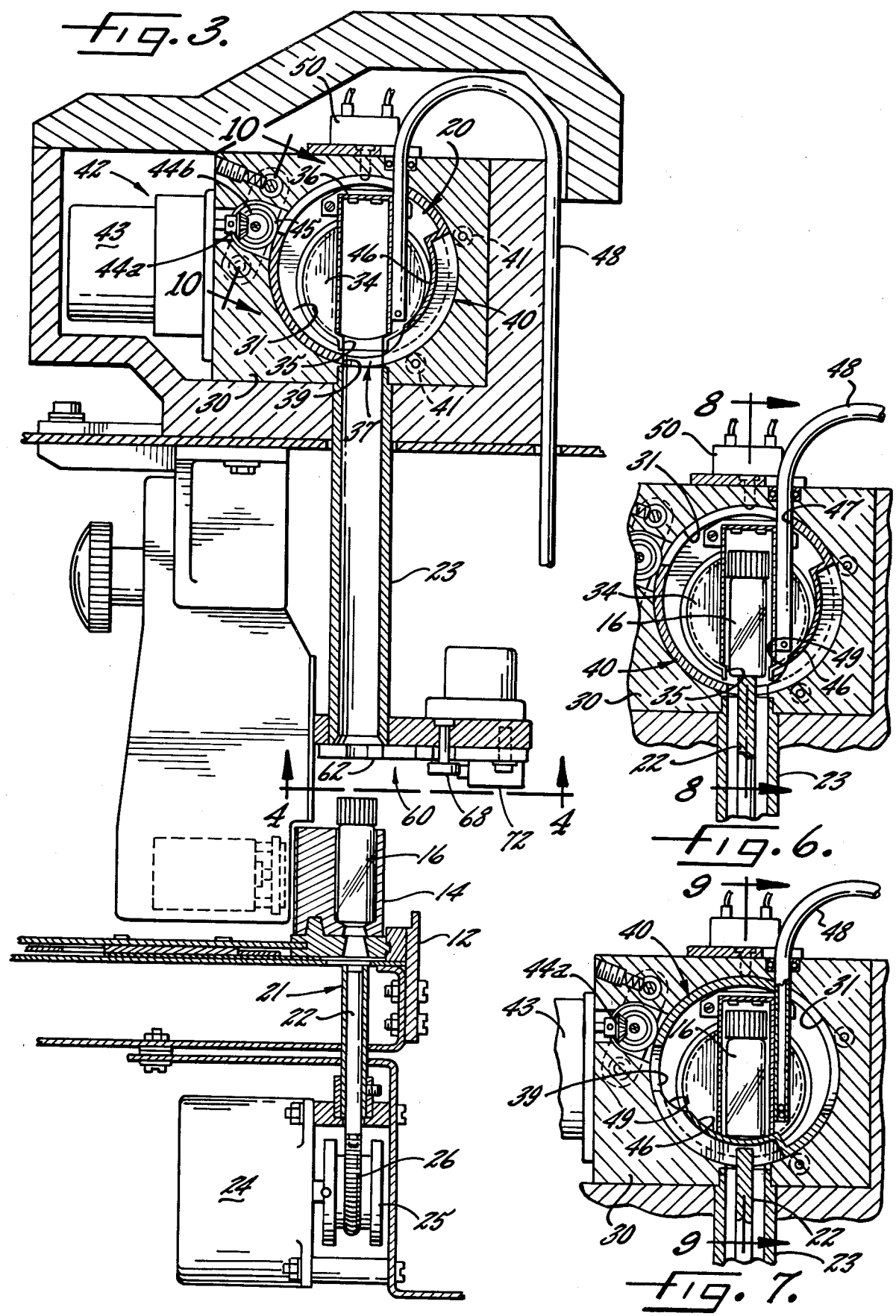

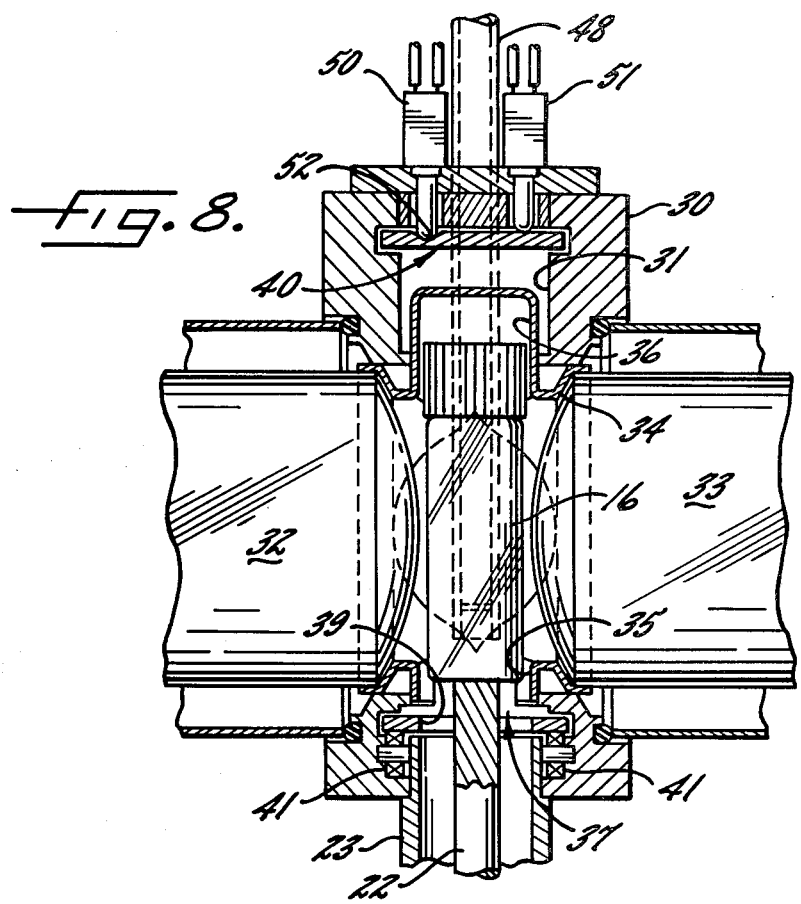
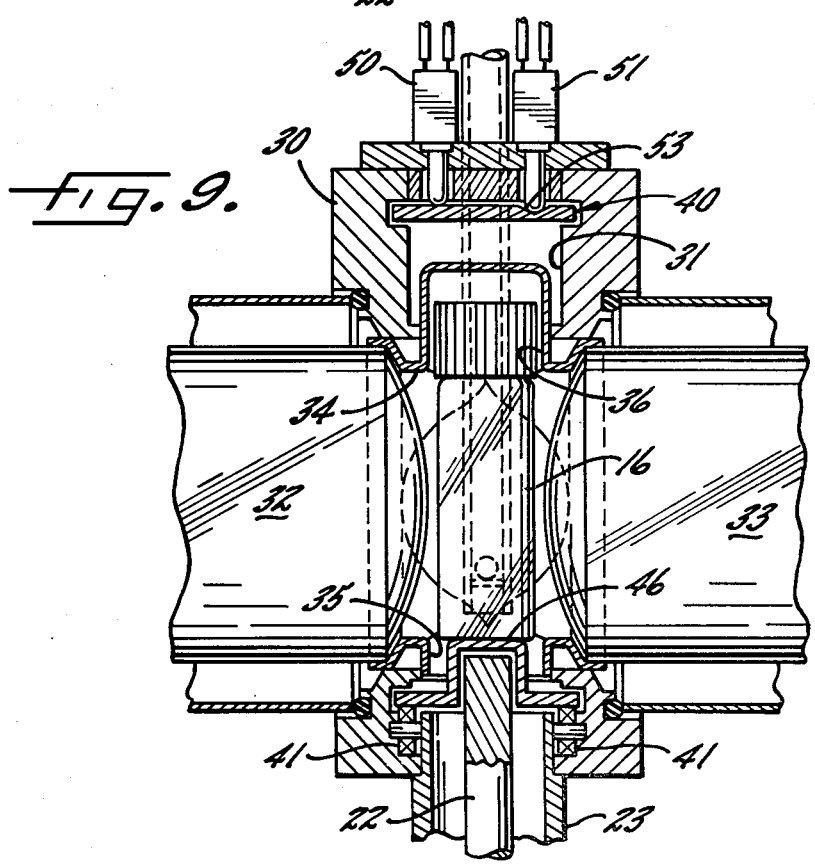

SCINTILLATION COUNTER WITH ROTATABLE LIGHT SEAL

DESCRIPTION OF THE INVENTION

The present invention relates generally to light seals and, more particularly, to a rotatable light seal for the shielded counting chamber of a scintillation counter.

In a typical scintillation counter, a plurality of sample vials containing radioactive samples in a liquid scintillator are transferred one at a time into a shielded counting chamber where the light flashes or scintillations produced by the sample can be reliably detected by photomultiplier tubes or other sensing means. To obtain an accurate count of the light scintillations, and therefore of the radioactive decay events, it is important that the counting chamber be light-tight, but the counting chamber must also be repeatedly opened and closed to permit the sample vials to enter and leave. It is also important that each vial that enters the counting chamber be aligned with respect to a reflector within the chamber so that scintillations emitted from all sides of the sample are reflected onto the photomultiplier tubes to maximize the counting efficiency.

Prior art scintillation counters have used a number of different means to exclude ambient light from their counting chambers. For example, U.S. Pat. No. 3,270,202 to Long et al. discloses a sample hood which descends over each vial while the vial is elevated into a counting chamber. The entire mechanism—hood, elevator and counting chamber—is contained within a light-tight drawer. U.S. Pat. No. 3,163,756 to Meeder et al. discloses an elevator which is fitted into a sleeve to prevent light from entering one end of the elevator shaft, while a reciprocating shutter excludes light from the other end of the elevator shaft where the vials enter the counting chamber.

It is a primary object of the present invention to provide an improved light seal which is effective in excluding ambient light from the counting chamber of a scintillation counter while permitting ingress and egress of sample vials, and yet is extremely simple and economical to manufacture, assemble, and maintain.

It is a more specific object of the invention to provide a rotatable light seal for a scintillation counter which includes a ring member or ring shutter that allows the passage of a sample vial into the counting chamber through an opening and then upon rotation, covers the opening with a shroud or cover member so that ambient light is excluded from the counting chamber during analysis of the sample.

It is a further object of the invention to provide a light seal having a rotatable shutter which is formed of a radiation shielding material and closely surrounds the sample vial in the counting chamber to enhance the shielding of the sample from ambient radiation during the counting process, and also to enhance the shielding of any standardizing gamma-emitting source while it is in the counting chamber.

Another object of the present invention is to provide a rotatable light seal which accurately controls the positioning of both the sample vials and the ring shutter. Thus, a more specific object of the invention is to provide accurate positioning of the sample vial relative to the reflector within the counting chamber so that the maximum number of scintillations from the sample are detected by the photomultipliers or other sensing means.

Other objects and advantages of the invention will become apparent upon reading the following detailed description and upon reference to the drawings, in which:

FIG. 3 is an enlarged sectional elevation view taken along line 3—3 in FIG. 1, with the elevator in its lowered position and the light seal in its open position;

FIG. 6 is a fragment of the same sectional view shown in FIG. 3 but with the elevator in its raised position and the light seal in its open position;

FIG. 7 is the same view shown in FIG. 6 but with the light seal in its closed position;

FIG. 8 is an enlarged sectional view taken along line 8—8 in FIG. 6;

FIG. 9 is an enlarged sectional view taken along line 9—9 in FIG. 7;

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
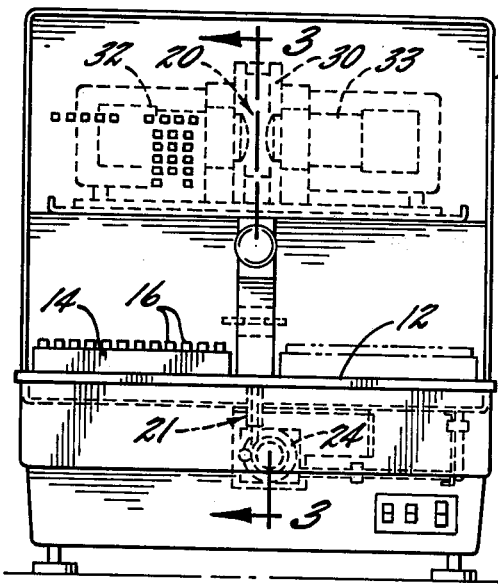
FIG. 1 is a front elevation view of a bench top scintillation counter including a rotatable light seal embodying the present invention.
Figure 2:
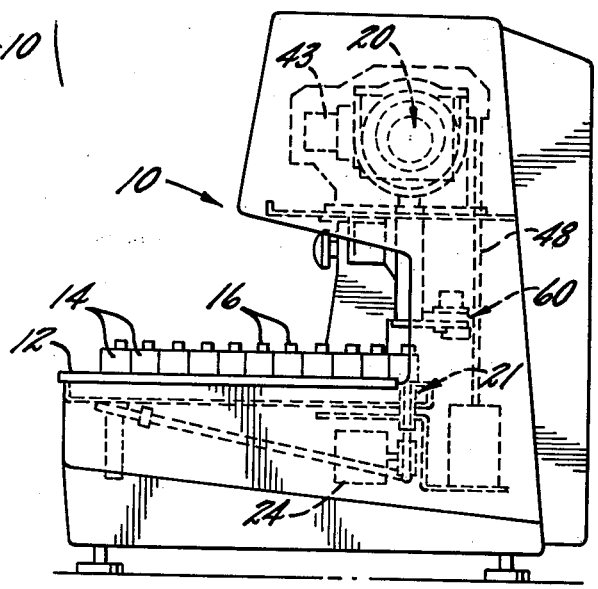
FIG. 2 is a side elevation view of the bench top scintillation counter shown in FIG. 1.

Turning first to FIGS. 1 and 2 there is shown an exemplary bench top scintillation counter 10 having a stage 12 supporting rows of cassettes 14, each of which carries a series of sample vials 16 containing radioactive samples. As the cassettes 14 are indexed along the back edge of the stage 12, an elevator 21 raises the vials 16 one at a time into a counting chamber 20 where the scintillation counting process actually takes place. After each sample is counted, the elevator 21 returns it to the cassette 14.

As shown most clearly in FIG. 3, each cassette 14 is indexed along the stage to position successive sample vials 16 directly above the elevator 21. The elevator 21 includes a pedestal 22 which moves upwardly carrying the vial 16 into an entry tube 23 and thence into the counting chamber 20. The operation of the elevator pedestal 22 is controlled by a motor 24 driving a pulley 25 secured to one end of a coil spring 26. The elevator mechanism forms no part of the present invention and is more fully described in my copending patent application Ser. No. 779,367, filed Mar. 21, 1977 now U.S. Pat. No. 4,122,936, entitled "Centering Mechanism For Movable Member within A Variable-Width Passageway."

The counting chamber 20 comprises a radiation shielding housing 30 forming an internal cylindrical cavity 31 with two photomultiplier tubes 32 and 33 mounted at opposite ends thereof. The cylindrical cavity 31 has a bidirectional reflector 34 mounted within it for reflecting light scintillations from the sample onto the photomultiplier tubes. The reflector also forms internal guide portions 35 and 36 which define the locus of the sample vial during the counting process. An opening 37 at the bottom of the cavity 31 communicates with the entry tube 23 for admitting a sample vial 16 into the counting chamber 20.

In accordance with one important aspect of the present invention, the counting chamber is provided with an improved light seal comprising a ring shutter mounted in the shielded housing for rotation from an open position to a closed position, the ring shutter having an aperture for alignment with the opening into the housing in the open position and thereby allowing entry of the sample vial into the counting chamber, and a shroud portion adjacent the aperture for covering the opening in the housing when the ring shutter is rotated to the closed position. Thus, in the illustrative embodiment, a rotatable ring shutter 40 is provided within the cavity of the counting chamber 20 surrounding the reflector 34 with the ends of the shutter 40 extending into mating grooves formed in the end walls of the cavity 31 (FIGS. 8 and 9). As shown most clearly in FIGS. 3 and 6–9, the ring shutter 40 is mounted on rollers 41 journaled in the housing 30 so that the shutter is supported for rotational movement within the cavity 31. Frictional driving means 42 including a motor 43, a pair of beveled gears 44a, 44b and "O" ring drive wheels 45 is provided to rotate the ring shutter 40 through an arc of about 90° between an open position (as shown in FIGS. 6 and 8) and a closed position (as shown in FIGS. 7 and 9).

The ring shutter 40 includes an aperture 39 which, when the shutter is in the open position, aligns with the opening 37 of the internal cylindrical cavity 31 and with the guide portions 35, 36 of the reflector 34 (FIG. 3). The shutter 40 also includes a shroud portion 46 which, when the shutter is in its closed position, covers the opening 37 of the cavity 31 in order to block light coming through the entry tube 23. A slot 47 in the shutter 40 provides access into the counting chamber for a tube 48 which delivers a pellet of radium or other gamma-emitting material into the counting chamber for automatic standardization.

The ring shutter 40 is preferably formed of a radiation-shielding material such as brass and closely surrounds the locus of a sample vial within the counting chamber to supplement the shielding provided by the housing 30. The purpose of the shielding is not only to prevent ambient radiation from affecting the counting process, but also to prevent gamma rays from escaping from the counting chamber when the radium pellet is in the chamber. Since the ring shutter 40 is in close proximity to the sample vial in the counting chamber, the shielding afforded by the shutter material is highly efficient.

For the purpose of engaging the bottom of the vial 16 and lifting it from the elevator pedestal 22 as the shutter moves from its open position (FIG. 6) to its closed position (FIG. 7), the ring shutter 40 also includes, as parts of the shroud, a cam or locator portion 49 (see FIGS. 6 and 7). In conjunction with the cam 49, the guide portions 35, 36 of the reflector 34 accurately position the sample vial relative to the reflector itself in order to maximize the effect of the reflector. Moreover, because the cam 49 and guide portions 35, 36 accurately position the vial, the vertical travel of the elevator pedestal 22 is not as critical as it would otherwise be.

It will be apparent that except for the drive mechanism the rotatable light seal has only a single moving part—the ring shutter 40. As a result, the rotatable light seal is simple and economical to manufacture, assemble and maintain, and yet it provides an extremely effective light seal while at the same time providing an efficient supplement to the radiation shielding.

Figure 11:
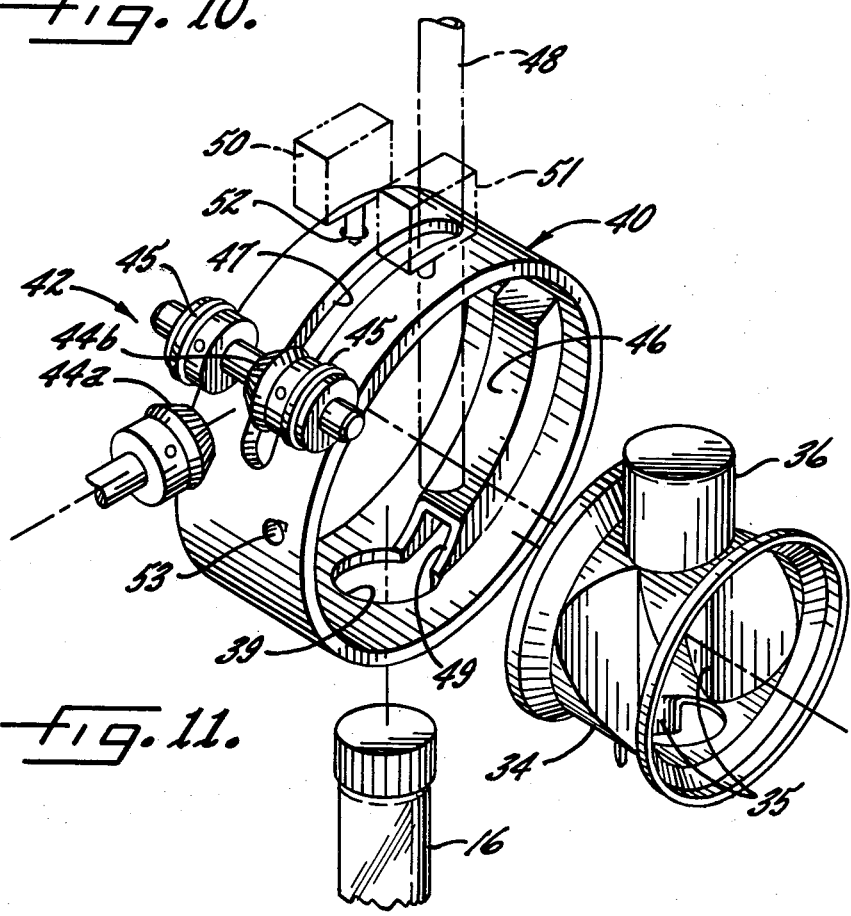
FIG. 11 is an exploded perspective view of the rotatable light seal along with its driving means and the internal reflector.

Control of rotational movement of the ring shutter 40 is accomplished by two limit switches 50 and 51 (FIGS. 8, 9 and 11) whose actuators ride on the outer surface of the shutter 40 in line with a pair of recesses 52 and 53 which allow the switch actuators to advance when in register therewith. These switches 50 and 51 energize and de-energize the shutter drive motor 43 in opposite directions so that the shutter 40 can be reciprocated between its open and closed positions. More specifically, when the actuator of limit switch 50 engages the recess 52, the shutter is in the "open" position (FIG. 8). On the other hand, when the actuator of the limit switch 51 engages the recess 53, the shutter is in the "closed" position (FIG. 9). Together the two limit switches 50 and 51 provide a continuous indication of the status of the shutter ring, i.e., whether it is open, closed, or, when both of the switches are riding on the surface of the ring with their actuators retracted, in an intermediate position.

Figure 4:
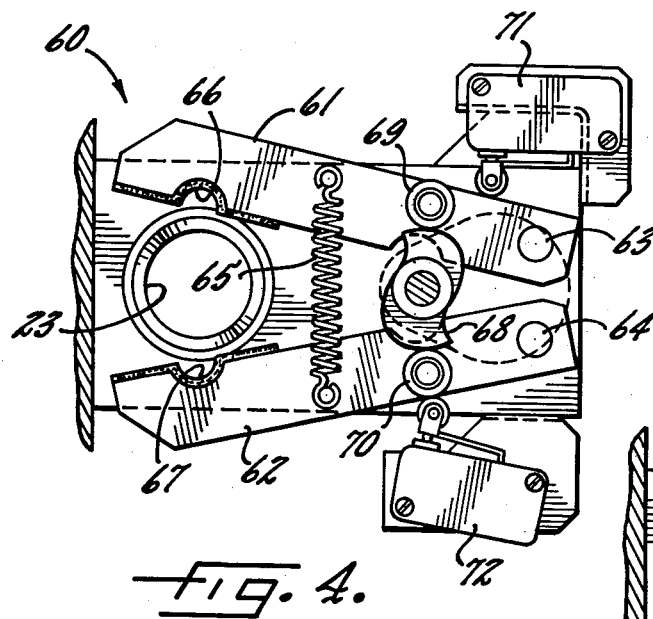
FIG. 4 is a sectional view taken along line 4—4 in FIG. 3 and showing an optional clamp-type light seal in its open position at the lower end of the entry tube.
Figure 5:
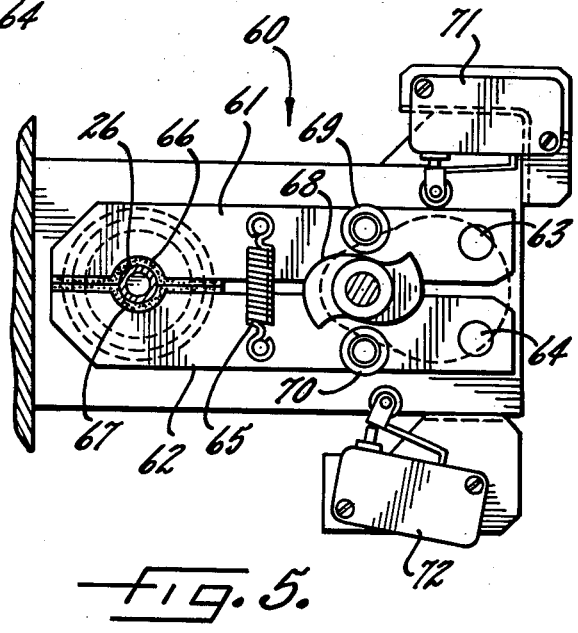
FIG. 5 is the same sectional view shown in FIG. 4 but with the clamp-type seal in its closed position.
Figure 10:
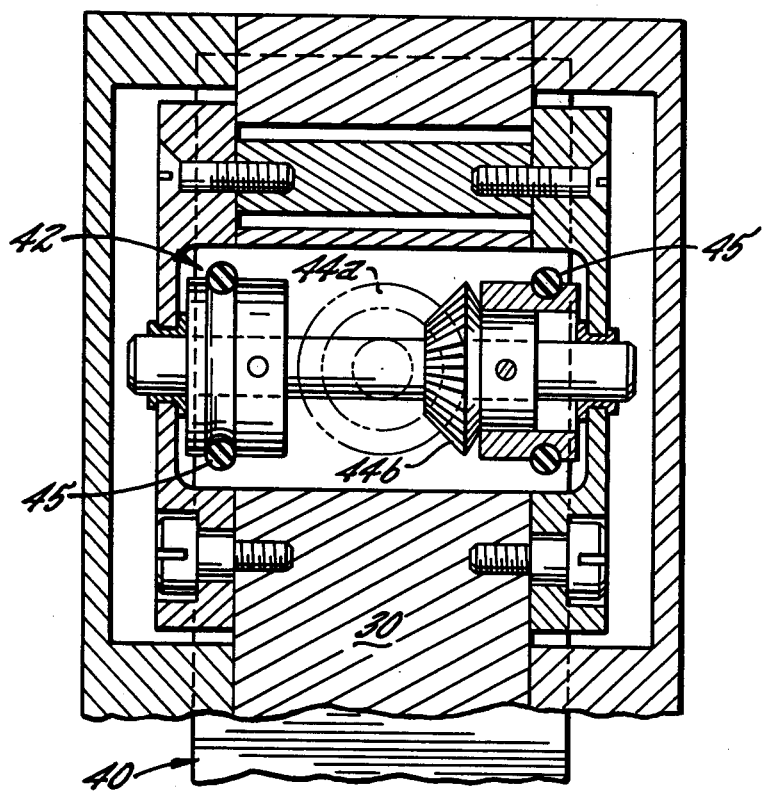
FIG. 10 is an enlarged sectional view taken along line 10—10 in FIG. 3.

In order to block light from entering the lower end of the entry tube 23 when the ring shutter 40 is open, a clamp-type light seal 60 is preferably provided at the lower end of the tube 23. This seal 60 is normally required only when a relative large-diameter entry tube 23 is required, because the lower end of the tube 23 is not exposed to most sources of ambient light, which are usually overhead in the form of ceiling lights or the like. As can best be seen in FIGS. 4 and 5, the illustrative light seal 60 includes complementary jaws 61 and 62 which are pivoted at their ends 63 and 64, respectively. A biasing spring 65 is provided to bias the jaws toward their closed positions, where padded complementary notches 66 and 67 form a circular opening just large enough to pass the elevator pedestal 22 and spring 26. The resiliently padded surfaces of the notches 66 and 67, which can be made of felt for example, rub lightly against the surface of the elevator pedestal 22 and spring 26 as they pass therethrough, thereby providing the desired light seal.

The opening and closing of the jaws 61 and 62 is controlled by a motor-drive rotary cam 68 which engages followers 69 and 70 on the respective jaws. Limit switches 71 and 72 are provided in order to sense whether or not the jaws are fully open. During traversing movement of the elevator, the jaws 61 and 62 are held open by the cam 68 in the position shown in FIG. 4. When the elevator pedestal 22 has positioned the vial within the entry tube 23, the cam 68 is turned to the position shown in FIG. 5, and the jaws 61 and 62 are closed by means of the biasing spring 65.

A typical operating cycle of the illustrative mechanism is as follows. With the elevator in its lowered position, the rotatable light seal is initially closed and the clamp-type light seal is open. The elevator 21 then begins to ascend. After the sample vial 16 carreid on the elevator pedestal 22 clears the open clamp-type seal 60, the jaws 61 and 62 are closed, and the ring shutter 40 is thereafter opened. If desired, the elevator can be programmed to stop momentarily with the sample vial within the entry tube 23 to allow time for the jaws 61 and 62 to close before the ring shutter 40 is opened.

After the ring shutter 40 is opened, the elevator lifts the sample vial 16 through the aperture 37 into the counting chamber 20. The elevator then stops, and the motor 43 is energized to rotate he ring shutter 40 (clockwise as viewed in FIGS. 3, 6 and 7) to its closed position, camming the sample vial into precisely the desired counting position as the shutter closes. When the ring shutter 40 has been rotated to its closed position (FIG. 7), the actuator of the limit switch 51 advances into the recess 53 and de-energizes the drive motor 43. The sample is then "counted," after which the motor 43 is re-energized to drive the ring shutter 40 in the counterclockwise direction as viewed in FIGS. 3, 6 and 7 until the shutter reaches its open position, where the actuator of the switch 50 advances into the recess 52 and de-energizes the motor 43 again. As the ring shutter 40 rotates counterclockwise, the cam 49 passes beneath and away from the vial 16, allowing the vial 16 to return to rest on the elevator pedestal 22.

With the ring shutter 40 open, the elevator begins its descent, lowering the sample vial out of the counting chamber 20 through the apertures 50 and 37 and into the entry tube 23. As soon as the sample vial clears the ring shutter 40, the motor 43 is energized again to return the ring shutter 40 to its closed position. Before the top of the pedestal 22 reaches the clamp-type seal 60, but after the ring shutter 40 is closed, the jaws 61 and 62 are opened to permit the sample vial to pass therethrough. Again, the elevator may be stopped momentarily with the sample vial within the entry tube 23 to allow time for the ring shutter 40 to close before the jaws 61 and 62 are closed.

With the jaws 61 and 62 open, the elevator continues its descent, returning the sample vial 16 to its original position in the cassette 14. The cassette 14 is then indexed to align the next vial with the elevator, and the cycle is repeated.

As can be seen from the foregoing detailed description, this invention provides an improved light seal which is effective in excluding ambient light from the counting chamber of the scintillation counter while permitting ingress and egress of sample vials, and yet is extremely simple and economical to manufacture, assemble and maintain. This is particularly true in view of the fact that the ring shutter can be formed as a single unitary member. The ring shutter not only serves as a light seal, but also assists in accurately positioning the sample vial within the counting chamber, and closely surrounds the sample vial in the counting chamber to enhance the shielding of the sample from ambient radiation during counting and of any standardizing gamma-emitting source admitted to the counting chamber.

I claim as my invention:

1. In a scintillation counter having a counting chamber formed by a housing having an internal cylindrical cavity and an opening for admitting a sample vial, an improved light seal comprising
    a ring shutter mounted in the internal cylindrical cavity for rotation from an open position to a closed position, said ring shutter having
    (i) an aperture for alignment with the opening in the housing in said open position and thereby allowing the sample vial admission to the internal cylindrical cavity and
    (ii) a shroud portion adjacent the aperture for covering the opening in the housing when the ring shutter is rotated to said closed position.

2. The scintillation counter of claim 1 wherein said ring shutter closely surrounds the sample vial and is formed of radiation shielding material.

3. The scintillation counter of claim 1 which includes driving means including friction drive wheels for frictionally engaging and driving said ring shutter between said open and closed positions.

4. The scintillation counter of claim 3 which includes position sensing means for determining (1) when the aperture of said ring shutter is aligned with the opening in the housing in said open position and (2) when the shroud portion of said ring shutter covers the opening in the housing in said closed position, to control said driving means.

5. The scintillation counter of claim 1 which includes reflector means within the internal cylindrical cavity, said reflector means having a guide portion for laterally positioning the sample vial with respect to the reflector, and wherein the shroud portion of said ring shutter includes a cam for engaging the sample vial while said ring shutter rotates from said open position to said closed position and lifting the sample vial to a predetermined elevation within the guide portion of said reflector means.

6. The scintillator counter of claim 1 which includes a vertical entry tube leading to said counting chamber, for transferring sample vials one at a time to and from said counting chamber through said entry tube, and a clamp light seal mounted at the lower end of the entry tube and comprising a pair of cooperating jaws each having complementary recesses faced with a resilient material for engaging said elevator when said jaws are closed and thereby blocking light from entering the entry tube while said ring shutter is open.

* * * * *